United States Patent
Gleason et al.

[19]

[11] Patent Number: 5,924,729
[45] Date of Patent: Jul. 20, 1999

[54] SEAT BELT WEBBING ENERGY MANAGEMENT DEVICE

[75] Inventors: Michael P. Gleason, Chesterfield; James S. Brooks, Almont, both of Mich.

[73] Assignee: TRW Vehicle Safety Systems Inc., Lyndhurst, Ohio

[21] Appl. No.: 08/814,403

[22] Filed: Mar. 11, 1997

[51] Int. Cl.[6] .................................................. B60R 22/28
[52] U.S. Cl. ........................ 280/805; 297/472; 188/371
[58] Field of Search .............................. 280/805, 801.1; 188/371, 374; 297/471, 472

[56] References Cited

U.S. PATENT DOCUMENTS

| | | | |
|---|---|---|---|
| 2,932,871 | 4/1960 | Phillips et al. | 280/801.1 |
| 3,938,627 | 2/1976 | Nagazumi | 188/371 |
| 3,973,650 | 8/1976 | Nagazumi | 280/805 |
| 5,487,562 | 1/1996 | Hedderly et al. | 280/777 |
| 5,658,012 | 8/1997 | Villarreal et al. | 280/805 |
| 5,700,034 | 12/1997 | Lane, Jr. | 280/805 |
| 5,700,035 | 12/1997 | Bock | 280/805 |

*Primary Examiner*—J J Swann
*Assistant Examiner*—James S. McClellan
*Attorney, Agent, or Firm*—Tarolli, Sundheim, Covell Tummino & Szabo

[57] ABSTRACT

An energy management device (10) for connecting a length of belt webbing (16) with a vehicle portion (30) includes an elongate strap (50). The strap (50) has a fixed end portion (100) for connection with the vehicle portion (30), a free end portion (102), and an intermediate portion (110) extending between and interconnecting the fixed end portion and the free end portion. The device (10) has an unactuated condition in which force is transmitted from the belt webbing (16) to the vehicle portion (30) through the strap (50) between the fixed end portion (100) and a first point (116) on the strap which is on the intermediate portion (110) of the strap. Upon the application of a force greater than a predetermined force to the belt webbing (16), the device (10) moves an actuated condition in which force is transmitted between the fixed end portion (100) of the strap (50) and a second point (116a) on the strap which is farther from the fixed end portion than the first point (116).

3 Claims, 2 Drawing Sheets

SEAT BELT WEBBING ENERGY MANAGEMENT DEVICE

BACKGROUND OF THE INVENTION

1. Technical Field

The present invention relates to a vehicle occupant safety system. In particular, the present invention relates to an energy management device for seat belt webbing used in a seat belt system.

2. Description of the Prior Art

Seat belt systems are commonly used to restrain vehicle occupants. A typical seat belt system for restraining a vehicle occupant includes a length of belt webbing extensible about the occupant and having opposite ends anchored to a portion of the vehicle such as a vehicle seat. In the event of sudden deceleration such as occurs in a vehicle collision, the occupant tends to move forward relative to the vehicle and is restrained by the belt webbing.

The vehicle occupant can experience a sudden load if the occupant's forward movement is restrained by an inextensible length of belt webbing. To alleviate this sudden load, it is known to secure one end of the length of belt webbing with an energy absorber or energy management device. When the occupant engages the belt webbing with sufficient force, the load on the belt webbing actuates the energy management device. The energy management device permits the belt webbing to move slightly, and the occupant's movement is restrained at a reduced rate over an increased period of time. This can reduce the abruptness of the load experienced by the vehicle occupant.

SUMMARY OF THE INVENTION

The present invention is a vehicle safety apparatus comprising an energy management device for connecting a length of belt webbing in a force-transmitting relationship with a vehicle portion. The apparatus comprises an elongate strap for transmitting force from the belt webbing to the vehicle portion. The strap has a fixed end portion for connection with the vehicle portion, a free end portion, and an intermediate portion extending between and interconnecting the fixed end portion and the free end portion. The device has an unactuated condition in which force is transmitted from the belt webbing to the vehicle portion through the strap between the fixed end portion and a first point on the strap which is on the intermediate portion of the strap. The device is movable, upon the application of a force greater than a predetermined force to the belt webbing, from the unactuated condition to an actuated condition in which force is transmitted from the belt webbing to the vehicle portion through the strap between the fixed end portion of the strap and a second point on the strap which is farther from the fixed end portion than the first point.

In a preferred embodiment, the energy management device comprises a base for connection in a force-transmitting relationship with the belt webbing, and a roller supported on the base. The strap extends around the roller and resists movement of the base away from the vehicle portion. The strap is movable through the base around the roller upon the application of a force greater than a predetermined force to the belt webbing to enable the base to move along the strap away from the vehicle portion.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
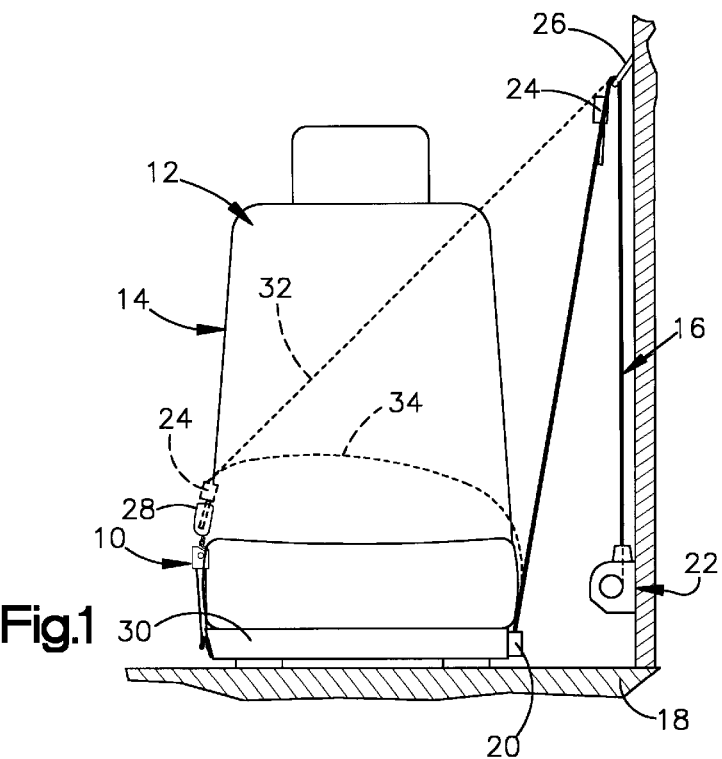
FIG. 1 is a schematic illustration of a vehicle seat belt system including a seat belt webbing energy management device which is constructed in accordance with the present invention.

The present invention relates to a vehicle occupant restraint, and in particular, to an energy management device for seat belt webbing in a vehicle occupant restraint system. As representative of the present invention, FIG. 1 illustrates an energy management device 10. The energy management device 10 is incorporated in a three-point continuous loop seat belt system 12 for use in restraining an occupant of a vehicle.

During operation of the vehicle, an occupant of the vehicle sits on a seat 14 which is illustrated as a front passenger seat in the vehicle. A length of belt webbing 16 is extensible about the vehicle occupant. One end of the length of belt webbing 16 is anchored to the seat 14 at an anchor point 20. The opposite end of the belt webbing 16 is attached to a retractor 22 secured to the vehicle body 18. Intermediate its ends, the belt webbing 16 passes through a tongue assembly 24 and a D-ring 26. When the seat belt system 12 is not in use, the belt webbing 16 is wound on the retractor 22 and is oriented generally vertically on one side of the seat 14, as shown in solid lines in FIG. 1.

To engage the seat belt system 12, the tongue assembly 24 is manually grasped and is pulled across the lap and torso of the occupant sitting in the seat 14. As the tongue assembly 24 is pulled across the lap and torso of the occupant, the tongue assembly moves along the belt webbing 16, and the belt webbing is unwound from the retractor 22. When the belt webbing 16 has been pulled across the lap and torso of the occupant, the tongue assembly 24 is connected with a buckle 28, as shown in dashed lines in FIG. 1. The buckle 28 is connected to a portion 30 of the vehicle seat 14 on the side of the seat opposite the anchor point 20 and the retractor 22. When the seat belt system 12 is thus buckled, the length of belt webbing 16 is divided by the tongue assembly 24 into a torso portion 32 which extends across the torso of the occupant and a lap portion 34 which extends across the lap of the occupant.

A buckle such as the buckle 28 in a seat belt system such as the seat belt system 12 is typically connected to the vehicle body or to the seat by an inextensible cable or length of belt webbing. In accordance with the present invention, the energy management device 10 (FIG. 1) is located in the seat belt system 12 in a force-transmitting relationship between the buckle 28 and the seat portion 30.

The energy management device 10 includes a base assembly 40 and a strap 50. The base assembly 40 includes a base 60 which is formed from sheet metal. As illustrated, the base 60 has a generally C-shaped configuration including a bottom wall 62 and spaced, parallel side walls 64 and 66.

Portions of the base 60 extending from the side walls 64 and 66 form a top wall 68 of the base.

A connector portion 70 of the base 60 extends toward the buckle 28. The connector portion 70 of the base 60 is secured to a connector portion 72 of the buckle 28.

The base assembly 40 includes a support pin 74. Opposite end portions of the support pin 74 are secured to the side walls 64 and 66 of the base 60. A central portion 80 of the support pin 74 extends between the side walls 64 and 66 of the base 60. The central portion 80 of the support pin 74 has a cylindrical outer surface 82 centered on an axis 84. The axis 84 is fixed in position relative to the base 60.

The base assembly 40 includes a roller 90 supported on the pin 74 for rotation about the axis 84 relative to the pin and relative to the base 60. The roller 90 has a hollow cylindrical configuration including parallel, cylindrical inner and outer surfaces 92 and 94 centered on the axis 84. The inner surface 92 of the roller 90 is closely fitted around the outer surface 82 of the support pin 74. A dry lubricant (not shown) is disposed intermediate the inner surface 92 of the roller 90 and the outer surface 82 of the pin 74. The lubricant promotes smooth rolling action of the roller 90 on the pin 74.

The outer surface 94 of the roller 90 is knurled or ridged or otherwise configured to provide a non-slip surface. In the illustrated roller 90, a series of projections in the form of axially extending ridges or teeth 96 are located on the outer surface 94 of the roller. The teeth 96 project radially outward in a direction away from the axis 84.

The strap 50 is a deformable elongate member which connects the base assembly 40 in a force-transmitting relationship with the seat portion 30. The strap 50 is able to sustain high loadings from the seat belt system 12, for example, up to about 4,500 pounds. The material from which the strap 50 is made is relatively soft as compared to the material from which the roller 90 is made. A preferred material for the strap 50 is a ductile metal such as HSLA 970 steel which is not heat treated.

The strap 50 has opposite first and second end portions 100 and 102. The first end portion 100 of the strap 50 is secured by a fastener 106, such as a bolt or rivet, to the seat portion 30. The second end portion 102 of the strap 50 is folded over and secured to itself, with a fastener 108 such as a pierce nut or rivet.

The second end portion 102 of the strap 50 is a free end, or free end portion, of the strap 50. That is, the second end portion 102 of the strap 50 is not in engagement with the base assembly 40 when the energy management device 10 is in the unactuated condition shown in FIGS. 2 and 3. The second end portion 102 of the strap 50 is movable relative to the base assembly 40 and to the seat portion 30 and to the buckle 28, when the energy management device 10 is in the unactuated condition shown in FIGS. 2 and 3.

An intermediate portion 110 of the strap 50 extends between the first and second end portions 100 and 102 of the strap 50. The intermediate portion 110 of the strap 50 has first and second opposite major side surfaces 112 and 114. The intermediate portion 110 of the strap 50 has a uniform cross-sectional configuration along its entire length. The intermediate portion 110 of the strap 50 is relatively thin compared to the folded-over second end portion 102 of the strap.

Figures 3, 5:
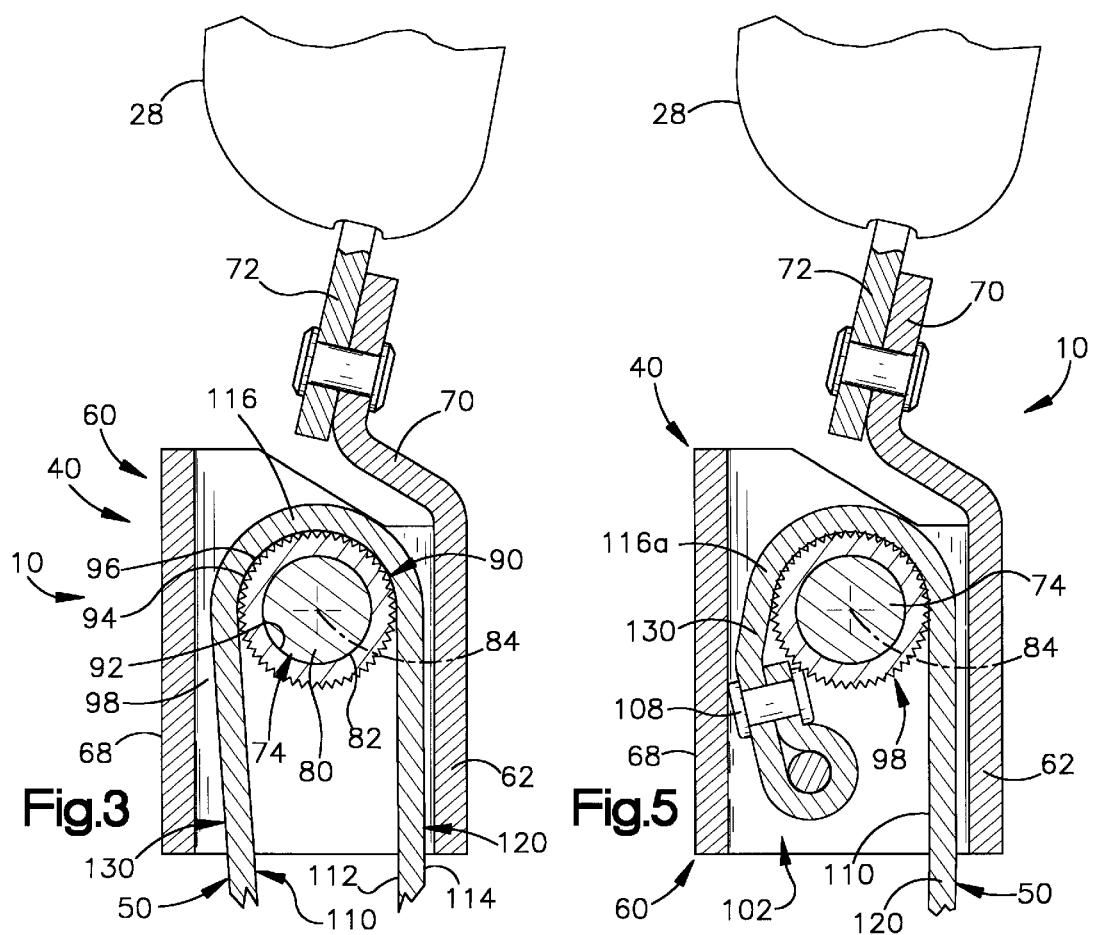
FIG. 3 is a sectional view of the energy management device of FIG. 2.
FIG. 5 is a view similar to FIG. 3 showing the energy management device in the actuated condition.
Figure 2:
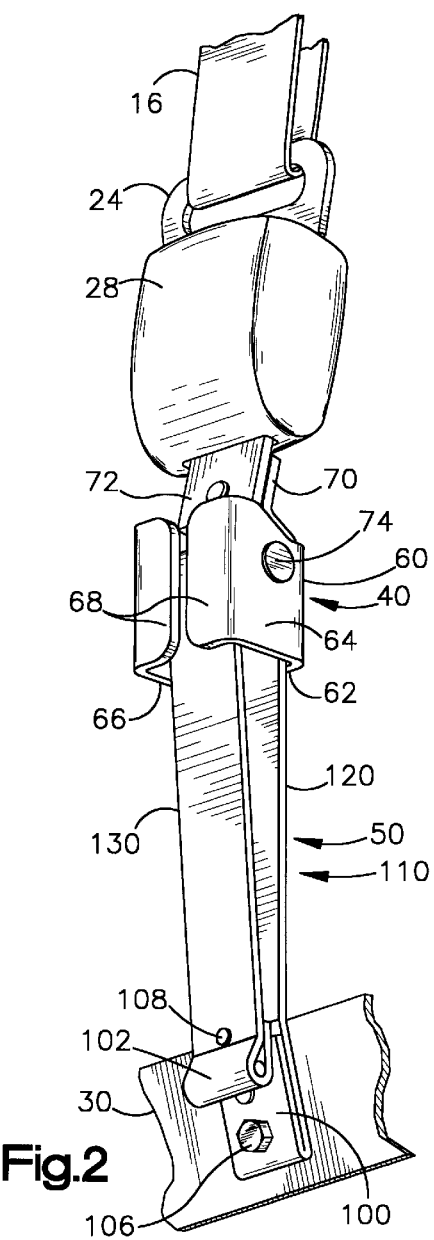
FIG. 2 is a perspective view of the energy management device of FIG. 1 shown in an unactuated condition.

When the energy management device 10 is in the unactuated condition illustrated in FIGS. 2 and 3, the strap 50 is in a "shortened" condition. That is, the base assembly 40 is spaced apart from the first end portion 100 of the strap 50 by a first, relatively short, distance. When the strap 50 is in the shortened condition, the intermediate portion 110 of the strap 50 has a U-shaped configuration wrapped around, or extending around, the roller 90. The strap 50 engages the roller 90 at a first point 116 (FIG. 3) on the strap.

The roller 90 defines two sections 120 and 130 of the U-shaped strap 50. The first section 120 of the strap 50 extends in a straight line between the roller 90 and the first end portion 100 of the strap 50. The second section 130 of the strap 50 extends in a straight line between the roller 90 and the second end portion 102 of the strap 50. The first and second sections 120 and 130 of the strap 50 extend generally parallel to and are adjacent to each other. The first and second sections 120 and 130 of the strap 50 are substantially the same length.

The strap 50 normally remains in the shortened condition shown in FIGS. 2 and 3 because it is rigid enough to resist being pulled through the base assembly 40. Specifically, in order for the strap 50 to be pulled through the base assembly 40, the strap 50 must travel in an arcuate path around the roller 90, bending constantly as it passes around the roller 90. The material and dimensions of the strap 50 are selected so that the strap 50 resists such bending deformation during normal usage of the seat belt system 12.

As a result, the energy management device 10 normally remains in the unactuated condition. The strap 50 and the base assembly 40 support the buckle 28 in the desired position for receiving the tongue assembly 24. When the seat belt system 12 is buckled, force is transmitted from the belt webbing 16 to the seat portion 30 through the strap 50. The force is transmitted between the first end portion 100 of the strap and the part of the intermediate portion 110 of the strap which extends around the roller 90, at the point 116. The buckle 28 does not move away from the seat portion 30 unless a tensile force greater than a predetermined force is applied to the buckle 28. The predetermined force is selected to be a force which is not experienced during use of the seat belt system 12 other than in a vehicle collision.

In the event of sudden deceleration such as occurs in a vehicle collision, the vehicle occupant moves forward in the vehicle relative to the vehicle body 18 and applies force against the belt webbing 16. The kinetic energy of the forward moving vehicle occupant is transmitted through the belt webbing 16 and the buckle 28 into the energy management device 10 and, specifically, into the strap 50. A tensile force greater than the predetermined force is applied to the strap 50.

The resistance to bending of the strap 50 is not sufficient to maintain the strap 50 in the shortened condition shown in FIGS. 2 and 3 if the force applied to the strap is above the predetermined force. In such an event, the strap 50 deforms and the base assembly 40 moves along the strap in a direction away from the fixed first end portion 100 of the strap. The base assembly 40 moves away from the seat portion 30, in an upward direction as viewed in FIGS. 2–5. The energy management device 10 moves from the unactuated condition shown in FIGS. 2 and 3 to the actuated condition shown in FIGS. 4 and 5.

As the base assembly 40 moves along the strap 50, the second section 130 of the strap is drawn through the base assembly 40. The strap 50 moves in an arcuate path around the roller 90. The material of the strap 50 deforms or bends continuously as it passes around the roller 90. The portion of the strap 50 extending around the roller 90 applies force to the roller to cause the roller to rotate on the pin 74. The lubricant between the roller 90 and the pin 74 promotes smooth rolling action of the roller on the pin, even under the high loads and high local temperatures experienced at the areas of engagement between the roller and the pin.

The relatively hard teeth 96 on the outer surface of the roller 90 dig into the relatively soft material of the strap 50. The outer surface of the roller 90 moves at the same angular surface speed as the side surface 112 of the strap 50 which the roller engages. As a result, there is negligible slipping between the strap 50 and the roller 90 as the roller rotates. This non-slip, rolling engagement between the roller 90 and the strap 50 minimizes variation in the resistance to movement of the strap through the base assembly 40. The strap 50 moves through the base assembly 40 in an even, consistent manner along its entire length.

The second end portion 102 or free end of the strap 50 moves away from the first end portion 100 of the strap and toward the base assembly 40. The second section 130 of the strap 50, that is, the portion of the strap between the roller 90 and the second end portion 102, shortens. Simultaneously, the first section 120 of the strap, that is, the portion of the strap between the roller 90 and the first end portion 100, lengthens. The distance between the base assembly 40 and the first end portion 100 of the strap 50 increases from the first, relatively short, distance to a second, relatively long, distance.

The strap 50 thus extends over a period of time, from the shortened condition shown in FIGS. 2 and 3, until the strap engages the roller 90 at a second point 116a (FIG. 5) on the strap farther from the fixed end portion 100 than the first point 116. In the illustrated embodiment, the extension of the strap 50 ceases when the strap 50 is completely extended, or when the force exerted by the occupant decreases to an amount below that needed to continue deforming the material of the strap. During this extension process, the strap 50 resists but does not block relative movement between the buckle 28 and the seat portion 30.

Figure 4:
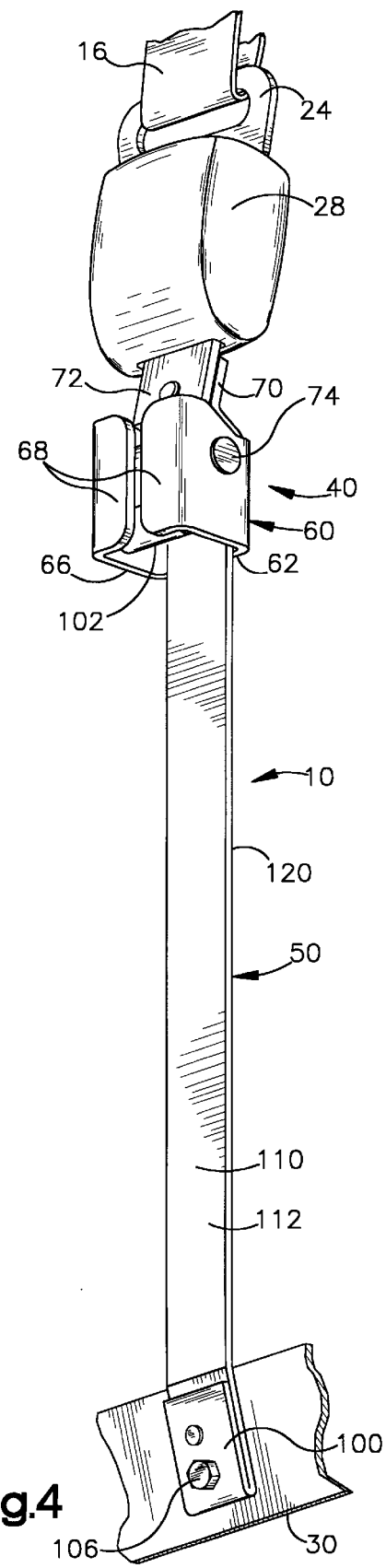
FIG. 4 is a view similar to FIG. 2 showing the energy management device in an actuated condition.

In the illustrated embodiment, the second point 116a on the strap 50 is on the second end portion 102 of the strap. When the strap 50 is completely extended, as illustrated in FIGS. 4 and 5, the second end portion 102 of the strap becomes caught in a gap 98 between the roller 90 and the top wall 68 of the base 60. The strap 50 can not extend any further. Tensile force is, thereafter, transmitted substantially undiminished, through the strap 50, between the buckle 28 and the seat portion 30. Force is transmitted through the strap 50 between the first end portion 100 of the strap and the second end portion 102 of the strap.

The extending of the strap 50 is not instantaneous but instead occurs over a period of time, because the resistance to bending of the strap retards the movement of the base assembly 40 and the buckle 28. During this time period, the seat belt system 12 does not fully block forward movement of the vehicle occupant. The occupant's forward movement does not cease until the strap 50 is completely extended, or until the force exerted by the occupant decreases to an amount below that needed to continue deforming the material of the strap.

Therefore, it can be seen that, in an event such as a vehicle collision, occupant deceleration resulting from engagement with the seat belt system 12 occurs over a longer period of time, as compared to occupant deceleration resulting from engagement with an inextensible seat belt system. This reduces the abruptness of the load on the vehicle occupant during a vehicle collision. All the kinetic energy of the moving vehicle occupant is transferred to the belt webbing 16 of the seat belt system 12, but over a longer time period. Transferring the same amount of kinetic energy to the belt webbing 16 over a longer period of time results in the lower rate of occupant deceleration. The energy management device 10 thus helps to manage and to control the kinetic energy of the moving vehicle occupant resulting from the sudden vehicle deceleration.

The resistance to bending of the strap 50 controls the period of time which is needed to move the strap from the shortened condition to the extended condition. Different materials, or different thicknesses or widths of strap material, can be used to provide different amounts of resistance to bending. Thus, the characteristics of the energy management device 10 can be controlled as desired.

From the above description of the invention, those skilled in the art will perceive improvements, changes and modifications in the invention. For example, the thickness (or other characteristic) of the strap could vary so that the second point on the strap, at which the extension of the strap ceases, would be elsewhere than at the free end portion of the strap. As a result, the free end portion of the strap might not reach the roller and the strap might not extend fully. Also, the base 60 could have a configuration other than as illustrated, so long as it supports the roller and connects with the buckle. Further, an energy management device in accordance with the present invention could be used elsewhere in a seat belt system, such as with a retractor or a D-ring or a height adjuster, or as a belt webbing anchorage. Such improvements, changes and modifications within the skill of the art are intended to be covered by the appended claims.

Having described the invention, we claim:

1. An energy management device for connecting a length of belt webbing in a force-transmitting relationship with a vehicle portion, said device comprising:

an elongate strap for transmitting force from the belt webbing to the vehicle portion, said strap having a fixed end portion for connection with the vehicle portion, a free end portion, and an intermediate portion extending between and interconnecting said fixed end portion and said free end portion;

said free end portion of said strap being folded over and secured to itself by a fastener;

said device having an unactuated condition in which force is transmitted from the belt webbing to the vehicle portion through said strap between said fixed end portion and a first point on said intermediate portion of said strap;

said device being operable, upon the application of a force greater than a predetermined force to the belt webbing, from the unactuated condition to an actuated condition in which force is transmitted from the belt webbing to the vehicle portion through said strap between said fixed end portion of said strap and a second point on said strap which is farther from said fixed end portion than said first point;

said strap deforming continuously and moving in an arcuate path as said device moves from the unactuated condition to the actuated condition to resist operation of said device from the unactuated condition to the actuated condition, the deformation of said strap resisting operation of said device from the unactuated condition to the actuated condition;

a movable base for connection in a force-transmitting relationship with the belt webbing; and a roller supported on said base for rotation about an axis which is fixed in position relative to said base, said roller and said base defining a gap therebetween, said strap being movable around said roller upon the application of a force greater than the predetermined force to the belt webbing, the engagement between said strap and said roller resisting movement of said base away from the vehicle portion, a plurality of axially extending projections on said roller and in engagement with said strap for resisting slippage between said strap and said roller;

said folded-over free end portion of said strap becoming caught in said gap when said strap is extended to transmit force between said fixed end portion of said strap and said free end portion of said strap.

2. A device as set forth in claim 1 wherein said strap has a U-shaped configuration including a first section which shortens and a second section which lengthens as said device moves from the unactuated condition, said first section of said strap including said free end portion of said strap.

3. A device as set forth in claim 1 wherein said strap has a U-shaped configuration including first and second sections which extend in opposite directions from said roller.

* * * * *